United States Patent [19]

Sasuta et al.

[11] Patent Number: 5,293,638
[45] Date of Patent: * Mar. 8, 1994

[54] INTERSYSTEM COMMUNICATION SYSTEM AND METHOD

[75] Inventors: Michael D. Sasuta, Mundelein; Gary D. Erickson, Wilmette, both of Ill.

[73] Assignee: Motorola, Inc., Schaumburg, Ill.

[*] Notice: The portion of the term of this patent subsequent to Mar. 10, 2009 has been disclaimed.

[21] Appl. No.: 892,916

[22] Filed: Jun. 3, 1992

Related U.S. Application Data

[63] Continuation-in-part of Ser. No. 358,730, May 30, 1989, Pat. No. 5,095,529.

[51] Int. Cl.$^5$ .............................................. H04B 7/14
[52] U.S. Cl. ........................................ 455/16; 455/17; 455/20; 455/34.1; 455/56.1
[58] Field of Search ................... 455/15, 16, 17, 34.1, 455/54.1, 56.1, 53.1, 33.1; 379/58, 63

[56] References Cited

U.S. PATENT DOCUMENTS

| | | | |
|---|---|---|---|
| 4,553,262 | 11/1985 | Coe | 455/15 |
| 4,578,815 | 3/1986 | Persinotti | 455/15 |
| 4,670,905 | 6/1987 | Sandvos et al. | 455/33.1 |
| 4,833,701 | 5/1989 | Comroe et al. | 455/33.1 |
| 5,058,199 | 10/1991 | Grube | 455/15 |
| 5,095,529 | 10/1992 | Comroe et al. | 455/16 |

Primary Examiner—Reinhard J. Eisenzopf
Assistant Examiner—Andrew Faile
Attorney, Agent, or Firm—Wayne J. Egan

[57] ABSTRACT

Communication systems (101, 102) having dedicated communication resources are provided with receivers (111, 116) that monitor the communication resources (104, 108) of other communication systems. Communications between communication units in various systems are interchanged through appropriate interaction of the repeaters and the dedicated receivers so provided.

15 Claims, 1 Drawing Sheet

INTERSYSTEM COMMUNICATION SYSTEM AND METHOD

CROSS-REFERENCE TO RELATED APPLICATION

This is a continuation-in-part of prior application Ser. No. 07/358,730, filed May 30, 1989, now U.S. Pat. No. 5,095,529 by Michael David Sasuta and Gary Dean Erickson, the same inventors as in the present application, which prior application is assigned to Motorola, Inc., the same assignee as in the present application, and which prior application is hereby incorporated by reference verbatim, with the same effect as though the prior application were fully and completely set forth herein.

FIELD OF THE INVENTION

This application relates to communication systems including, but not limited to, interlinked trunked communication systems.

BACKGROUND OF THE INVENTION

Trunked communication systems are known in the art. In general such systems include a resource controller, which may be centrally located or distributed, that manages communications between communication units such as, for example, fixed location, mobile, and portable two-way radios, on a plurality of communication resources such as, for example, frequency pairs or time division multiplexing time slots, that are supported by a plurality of corresponding repeaters.

A number of such systems are available, including the Smartnet and Privacy Plus systems from Motorola, the Clearchannel LTR system from E.F. Johnson, and the Sixteen Plus and Sweet Sixteen systems from General Electric.

In general, such systems tend to operate independent of one another. Therefore, a communication unit located in a first system will generally not be able to communicate with a second communication unit located in a second communication system.

Some prior art systems interlink one or more communication systems through use of an appropriate dedicated land line. So configured, communication units in different communication systems may be able to communicate with one another. Such an approach, however, poses several disadvantages, including increased cost and relative inflexibility.

A need thus exists for a system and method for economically and flexibly interlinking two or more communication systems.

SUMMARY OF THE INVENTION

In a communication system comprising a first communication system and a second communication system;

the first communication system including at least a first communication unit, a first set of communication resources, and a first resource control means for controlling the first set of communication resources;

the second communication system including at least a second communication unit, a second set of communication resources, second resource control means for controlling the second set of communication resources, and second receiver means substantially compatible with the first set of communication resources for receiving communications sourced by the first communication system;

the first communication system further including first receiver means substantially compatible with the second set of communication resources for receiving communications sourced by the second communication system;

a method for establishing communications between the first communication unit and the second communication unit is disclosed. Briefly, in accordance with the present invention, the method comprises the steps of:

(a) receiving, at the first communication system, a request from the first communication unit to communicate with the second communication unit;

(b) sourcing, from the first resource control means using the first set of communication resources, a notification for at least the second communication unit of a need to communicate;

(c) receiving, at the second receiver means, the notification from the first communication system and providing that notification to the second resource control means; and, (d) sourcing, for the benefit of the second communication unit, at the second resource control means using the second set of communication resources, a notification of the need to communicate.

In one embodiment of an intersystem communication system and method, in accordance with the present invention, a receiver may be provided to accommodate each communication resource supported by the other communication system. This embodiment offers a high degree of flexibility in communication resource allocation.

DETAILED DESCRIPTION

Figure 1:
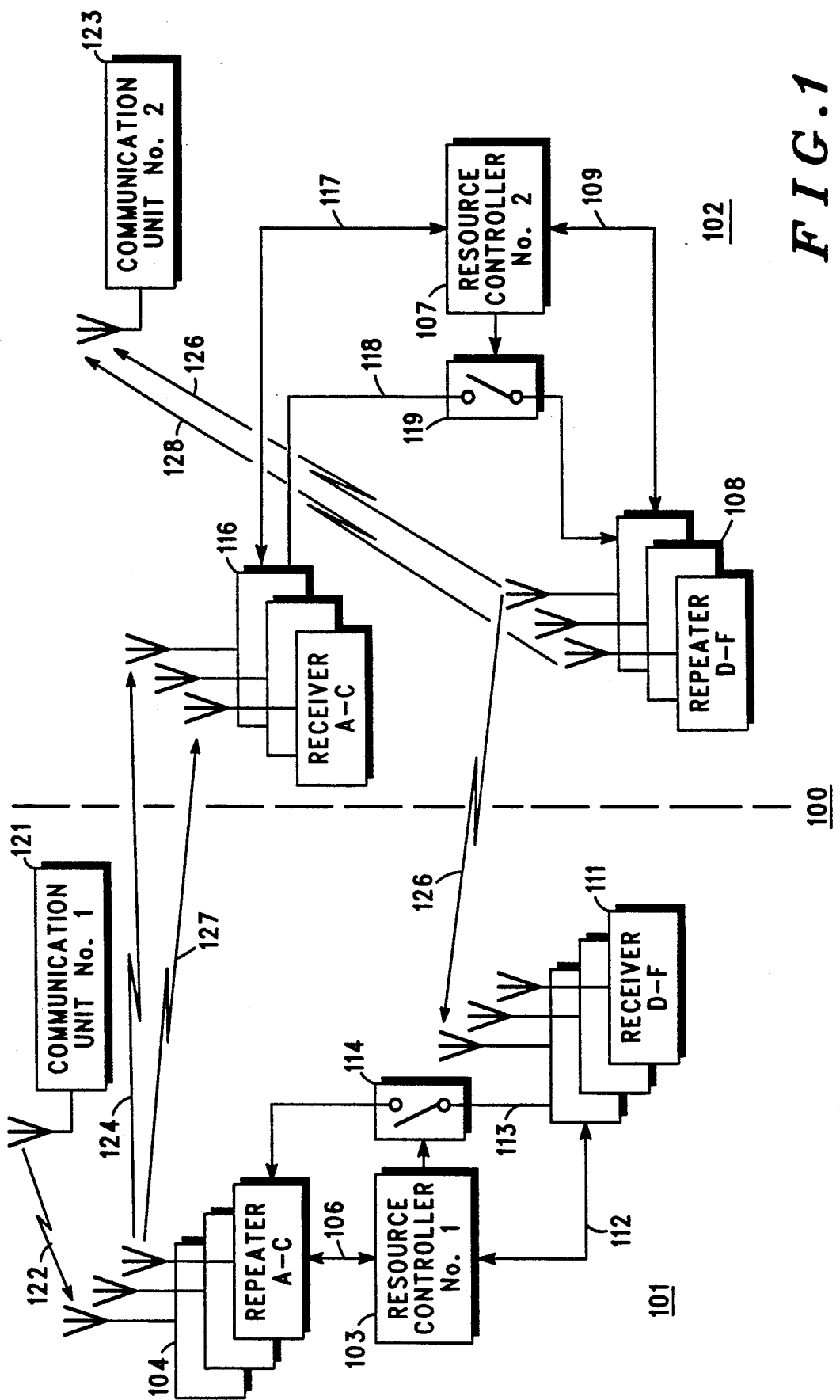
FIG. 1 comprises a block diagram depiction of a first embodiment of an intersystem communication system and method, in accordance with the present invention.

Referring to FIG. 1, a first embodiment of an intersystem communication system and method, in accordance with the present invention, is depicted generally by the numeral 100. The system 100 operates in conjunction with other communication systems. For purposes of this description, only two such communication systems, 101 and 102 will be described.

The first communication system 101 includes a resource controller 103 that functions to control allocation of a first set of communication resources. In this embodiment, it will be presumed that the communication resources are supported by a plurality of repeaters 104, and that the communication resources themselves comprise a first set of frequency pairs A-C. In addition, for purposes of this description, it will be presumed that one of the repeaters 104 supports system control information related to resource allocation requests and grants, all as well understood in the art. The resource controller 103 controls the repeaters 104 and interchanges resource allocation request and grant information through the repeaters 104, via an appropriate link 106.

The second communication system 102 similarly includes a resource controller 107, repeaters 108 which support communication resources D-F and an appropriate link 109 therebetween. In this embodiment, the communication resources A-C of the first system 101 are different from the communication resources D-F of the second system 102. Therefore, the two systems 101 and 102 are not able to communicate directly with one another through the repeaters provided.

The first communication system 101 also includes a plurality of receivers 111 that are capable of compatibly receiving the communication resources D-F of the second communication system 102. Although it would not necessarily be required that a receiver 111 be provided to accommodate each communication resource of the opposite system, in this embodiment such a receiver 111 has been so provided. An appropriate communication link 112 is provided between the receivers 111 and the resource controller 103 to allow operation of the receivers 111 to be controlled, at least in part, by the resource controller 103, and also to allow the resource controller 103 to receive signalling information as received by the receivers 111 and as sourced from the resource controller 107 of the second system 102. In addition, an appropriate link 113 is provided between the receivers 111 and the repeaters 104 of the first system 101. This link 113 is appropriately gated 114 to allow the resource controller 103 to control provision of signals received by the receivers 111 to the repeaters 104.

So configured, the resource controller 103 may cause a particular repeater 104 to retransmit a communication, such as a voice message, that has been received by one of the receivers 111.

A similar group of receivers 116, links 117 and 118 and gate unit 119 are provided in the second communication system 102 to provide an identical configuration as that described above.

Operation of the first embodiment 100 of an intersystem communication system and method, in accordance with the present invention, may now be described.

A first communication unit 121 situated within range of the first communication system 101 initiates the process by transmitting a request 122 to communicate with one or more other communication units although this request could be to communicate with a particular identified talk group, for purposes of simplicity, this description will presume that the first communication unit identifies a particular second communication unit 123 as the desired communication target. This talk request is transmitted on the appropriate control resource for the first communication system 101, and is relayed by the appropriate control resource repeater 104 to the resource controller 103 for the first communication system 101.

If the resource controller 103 recognizes the communication target as being local as may be determined, for example, by the identification number or "ID" of the communication target, then the resource controller 103 may allocate a communication resource to support the requested communication as is currently done in the prior art. If, however, the resource controller 103 determines that the communication target is not local or, if dealing with a talk group, is not completely local in all instances, then the resource controller may transmit, on the control resource, an outbound signalling word constituting a notification that a communication with the second communication unit is desired.

This outbound communication 124 as sourced by the resource controller 103 and as transmitted by the appropriate control resource repeater 104 will be received by whichever of the receivers 116 in the second communication system 102 is monitoring that particular communication resource of the first system 101. That particular receiver 116 will then provide the signalling information via the appropriate link 117 to the resource controller 107 for the second communication system 102. If the second resource controller 107 recognizes the identified communication target as local, the resource controller 107 will assign one of its communication resources to support the communication, and will provide information identifying the allocated resource in an outbound transmission 126 on its control resource.

This transmission 126 will be received by the second communication unit 123 and cause the second communication unit 123 to begin monitoring the allocated communication resource of the second communication system. This outbound transmission 126 will also be received by the corresponding receiver 111 of the first communication system 101. This received signalling information will be provided to the resource controller 103 thereof via the appropriate link 112. The resource controller 103 may now determine that the communication target has been located and that a communication resource in the second system 102 has been assigned to support the desired communication, will now assign one of its own communication resources to the first communication unit 121 to support the communication.

Thereafter, the first communication unit 121 will transmit its messages for example, voice messages using communication resources of the first communication system 101. The repeater 104 in the first communication system 101 assigned to support this communication will receive these signals from the first communication unit 121 and will repeat them on the allocated communication resource 127. The repeated voice message 127 will be received by the appropriate receiver 116 in the second communication system 102. The resource controller 107 in the second communication system 102 will gate 119 this received voice message to the repeater 108 that has been assigned to support this communication. The assigned repeater 108 will then retransmit the received signal 128 and this retransmission will be received by the second communication unit 123.

If the second communication unit 123 were to transmit a response to the first communication unit 121, the same procedure could be implemented in reverse in a transmission trunked mode, or the already allocated resources could be used in a reversed pattern to accommodate a message trunked methodology.

While various embodiments of an intersystem communication system and method, in accordance with the present invention, have been described hereinabove, the scope of the invention is defined by the following claims.

What is claimed is:

1. In a communication system comprising a first communication system and a second communication system;

the first communication system including at least a first communication unit, a first set of communication resources, and a first resource control means for controlling the first set of communication resources;

the second communication system including at least a second communication unit, a second set of communication resources, second resource control means for controlling the second set of communication resources, and second receiver means substantially compatible with the first set of communication resources for receiving communications sourced by the first communication system;

the first communication system further including first receiver means substantially compatible with the second set of communication resources for receiving communications sourced by the second communication system;

a method for establishing communications between the first communication unit and the second communication unit, comprising the steps of:

(a) receiving, at the first communication system, a request from the first communication unit to communicate with the second communication unit;

(b) sourcing, from the first resource control means using the first set of communication resources, a notification for at least the second communication unit of a need to communicate;

(c) receiving, at the second receiver means, the notification from the first communication system and providing that notification to the second resource control means; and, (d) sourcing, for the benefit of the second communication unit, at the second resource control means using the second set of communication resources, a notification of the need to communicate.

2. The method of claim 1, wherein step (d) includes a step of identifying a communication resource from the second set of communication resources that has been allocated to support the requested communication, in an outbound transmission on said second resource control means, the outbound transmission including information indentifying the allocated resource.

3. The method of claim 2 and including the further steps of:

(e) receiving, at the first receiver means, the outbound transmission including the identification of the allocated channel resource from the second set of communication resources;

(f) sourcing, from the first resource control means using the first set of communication resources, identification of a channel resource from the first set of channel resources that is allocated to support the requested communication.

4. The method of claim 3, and further including the steps of:

(g) thereafter transmitting a subsequent communication from the first communication unit using the allocated communication resource from the first set of communication resources;

(h) receiving, at the second receiver means, the subsequent communication;

(i) retransmitting, for the benefit of the second communication unit, the subsequent communication using the allocated communication resource from the second set of communication resources.

5. The method of claim 1 wherein:
the first communication system further includes a plurality of repeaters that support communications on the first set of communication resources; and
the second communication system further includes a plurality of repeaters that support communications on the second set of communication resources.

6. The method of claim 1 wherein step (a) includes a step of receiving the request on a previously identified first control resource that is a part of the first set of communication resources.

7. The method of claim 1 wherein step (b) includes a step of transmitting the notification on a previously identified first control resource that is a part of the first set of communication resources.

8. The method of claim 1 wherein step (c) includes a step of receiving the notification on a previously identified first control resource that is a part of the first set of communication resources.

9. The method of claim 1 wherein step (d) includes a step of transmitting the notification on a previously identified second control resource that is a part of the second set of communication resources.

10. In a communication system comprising:
a first communication system including:
at least a first communication unit,
a first set of communication resources, including a first control resource;
a first resource controller for controlling the first set of communication resources;
a second communication system including:
at least a second communication unit,
a second set of communication resources, including a second control resource;
a second resource controller for controlling the second set of communication resources; and,
a set of second receivers substantially compatible with the first set of communication resources for receiving communications sourced by the first communication system;
the first communication system further including a set of first receivers substantially compatible with the second set of communication resources for receiving communications sourced by the second communication system;
a method of establishing communications between the first communication unit and the second communication unit, comprising the steps of:

(a) receiving, at the first communication system on the first control resource, a request from the first communication unit to communicate with the second communication unit;

(b) sourcing, from the first resource controller using the first control resource, a notification for at least the second communication unit of a need to communicate;

(c) receiving, at the set of second receivers using the first control resource, the notification from the first communication system and providing that notification to the second resource controller;

(d) sourcing, for the benefit of the second communication unit, at the second resource controller using the second control resource, a notification of the need to communicate.

11. An arrangement comprising a first communication system and a second communication system,
the second communication system comprising a plurality of communication resources;
the first communication system comprising:
a plurality of communication units;
a set of predetermined communication resources;
resource control means for allocating the predetermined communication resources amongst communication units;
receiver means operably coupled to the resource control means for receiving radio frequency communications supported by the second communication system communication resources that are ordinarily used in the second communication system and that are not included in the set of predetermined communication resources;

means for selectively coupling the receiver means and the set of predetermined communication resources to allow communications received by the receiver means from the second communication system to be retransmitted using the predetermined communication resources.

12. In a communication system comprising a first communication system and a second communication system;

the first communication system including a first set of communication resources and a plurality of communication units capable of utilizing the first set of communication resources;

the second communication system including a second set of communication resources, a second receiver means substantially compatible with the first set of communication resources and capable of recovering communications sourced at the first set of communication resources, a second resource controller for controlling the second set of communication resources and the second receiver means, and a plurality of communication units capable of utilizing the second set of communication resources;

the first communication system further including a first receiver means substantially compatible with a second set of communication resources and capable of recovering communications sourced at the second set of communication resources, and a first resource controller for controlling the first set of communication resources and first receiver means;

a method for establishing communications between at least a first communication unit of the first communication system and at least a second communication unit of the second communication system, comprising the steps of:

at the first communication system:
  (a) receiving a request from the first communication unit to communicate with at least a second communication unit;
  (b) sourcing, by the first resource controller utilizing a first communication resource, a notification of the need to communicate with at least a second communication unit;

at the second communication system:
  (c) receiving, at the second receiver means, the notification of the need to communicate to the second communication unit from the first communication system, and providing this notification to the second resource controller;
  (d) sourcing a communication resource assignment to satisfy the received need to communicate notification from the first communication system;

at the first communication system:
  (e) receiving, via the first receiver means, the communication resource assignment of the second communication system to satisfy the need to communicate notification from the first communication system, and using the assigned communication resource to process the communication;
  (f) sourcing a communication resource assignment to satisfy the communication need at the first communication system;

at the second communication system:
  (g) receiving the communication resource assignment of the first communication system to satisfy the communication need, and using the assigned communication resource to process the communication.

13. The method of claim 12, wherein the sourcing step (d) includes a step of identifying a communication resource of the second set of communication resources that has been allocated to support the requested communication between at least a second communication unit and at least a first communication unit.

14. The method of claim 13, wherein the sourcing step (f) includes a step of identifying a communication resource of the first set of communication resources that has been allocated to support the requested communication between at least a first communication unit and at least a second communication unit.

15. The method of claim 14, including the further steps of:

at the first communication system:
  (h) thereafter transmitting a subsequent communication using the allocated communication resource from the first set of communication resources;

at the second communication system:
  (i) receiving at the second receiver means the subsequent communication; and,
  (j) retransmitting the subsequent communication using the allocated communication resource from the second set of communication resources.

* * * * *